(12) United States Patent
Gottin et al.

(10) Patent No.: US 11,562,223 B2
(45) Date of Patent: Jan. 24, 2023

(54) DEEP REINFORCEMENT LEARNING FOR WORKFLOW OPTIMIZATION

(71) Applicant: EMC IP Holding Company LLC, Hopkinton, MA (US)

(72) Inventors: Vinícius Michel Gottin, Rio de Janeiro (BR); Jonas F. Dias, Rio de Janeiro (BR); Daniel Sadoc Menasché, Rio de Janeiro (BR); Alex Laier Bordignon, Niterói (BR); Angelo Ernani Maia Ciarlini, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 1198 days.

(21) Appl. No.: 15/961,033

(22) Filed: Apr. 24, 2018

(65) Prior Publication Data
US 2019/0325304 A1 Oct. 24, 2019

(51) Int. Cl.
*G06N 3/08* (2006.01)
*G06F 9/50* (2006.01)

(52) U.S. Cl.
CPC ............. *G06N 3/08* (2013.01); *G06F 9/5027* (2013.01)

(58) Field of Classification Search
CPC .................................. G06N 3/08; G06F 9/5027
See application file for complete search history.

(56) References Cited

U.S. PATENT DOCUMENTS

| 9,336,483 | B1 * | 5/2016 | Abeysooriya | G06N 3/08 |
| 10,795,724 | B2 * | 10/2020 | Bahl | G06N 20/00 |
| 2012/0054768 | A1 * | 3/2012 | Kanna | G06F 9/5027 718/104 |
| 2016/0293133 | A1 * | 10/2016 | Dutt | G06F 8/20 |
| 2017/0277556 | A1 * | 9/2017 | Ishii | G06F 9/45558 |
| 2018/0165604 | A1 * | 6/2018 | Minkin | G06N 5/022 |

(Continued)

OTHER PUBLICATIONS

E. Wiewiora, "Potential-based shaping and Q-value initialization are equivalent," Journal of Artificial Intelligence Research, n° 19, pp. 205-208, 2003.

(Continued)

*Primary Examiner* — Beau D Spratt
(74) *Attorney, Agent, or Firm* — Ryan, Mason & Lewis, LLP

(57) ABSTRACT

Deep reinforcement learning techniques are provided for resource allocation in a shared computing environment. An exemplary method comprises: obtaining a specification of a workflow of a plurality of concurrent workflows in a shared computing environment, wherein the specification comprises a plurality of workflow states and one or more control variables for the workflow in the shared computing environment; evaluating values of the control variables for an execution of the concurrent workflows using a reinforcement learning agent by (i) observing the states, including a current state, and (ii) obtaining an expected utility score for combinations of the control variables for the execution of the concurrent workflows given an allocation of resources of the shared computing environment corresponding to the combination of control variables in the current state; and providing an allocation of the resources of the shared computing environment reflecting the combination having the expected utility score that satisfies a predefined score criteria.

20 Claims, 9 Drawing Sheets

(56) References Cited

U.S. PATENT DOCUMENTS

2018/0225587 A1\* 8/2018 Khidekel ............... G06N 7/005
2019/0130327 A1\* 5/2019 Carpenter ........... G06F 9/45558
2019/0236487 A1\* 8/2019 Huang ................... G06N 20/00

OTHER PUBLICATIONS

Kaelbling et al., "Reinforcement Learning: a survey," Journal of Artificial Intelligence Research, vol. 4, pp. 237-285, 1996.
V. Mnih et al., "Human-level control through deep reinforcement learning," Nature , vol. 518, n° 7540, pp. 529-533, 2015.
R. S. Sutton, "Generalization in reinforcement learning: Successful examples using sparse coarse coding.," Advances in neural information processing systems, 1996.
U.S. Appl. No. 15/800,587 entitled "Simulation-Based Online Optimization of Workflows", filed Nov. 1, 2017.
U.S. Appl. No. 15/364,449 entitled "Snapshots to Train Prediction Models and Optimize Workflow Execution" filed Nov. 30, 2016.
Patent Application entitled "Deep Reinforcement Learning for Workflow Optimization Using Provenance-Based Simulation", filed concurrently herewith.

\* cited by examiner

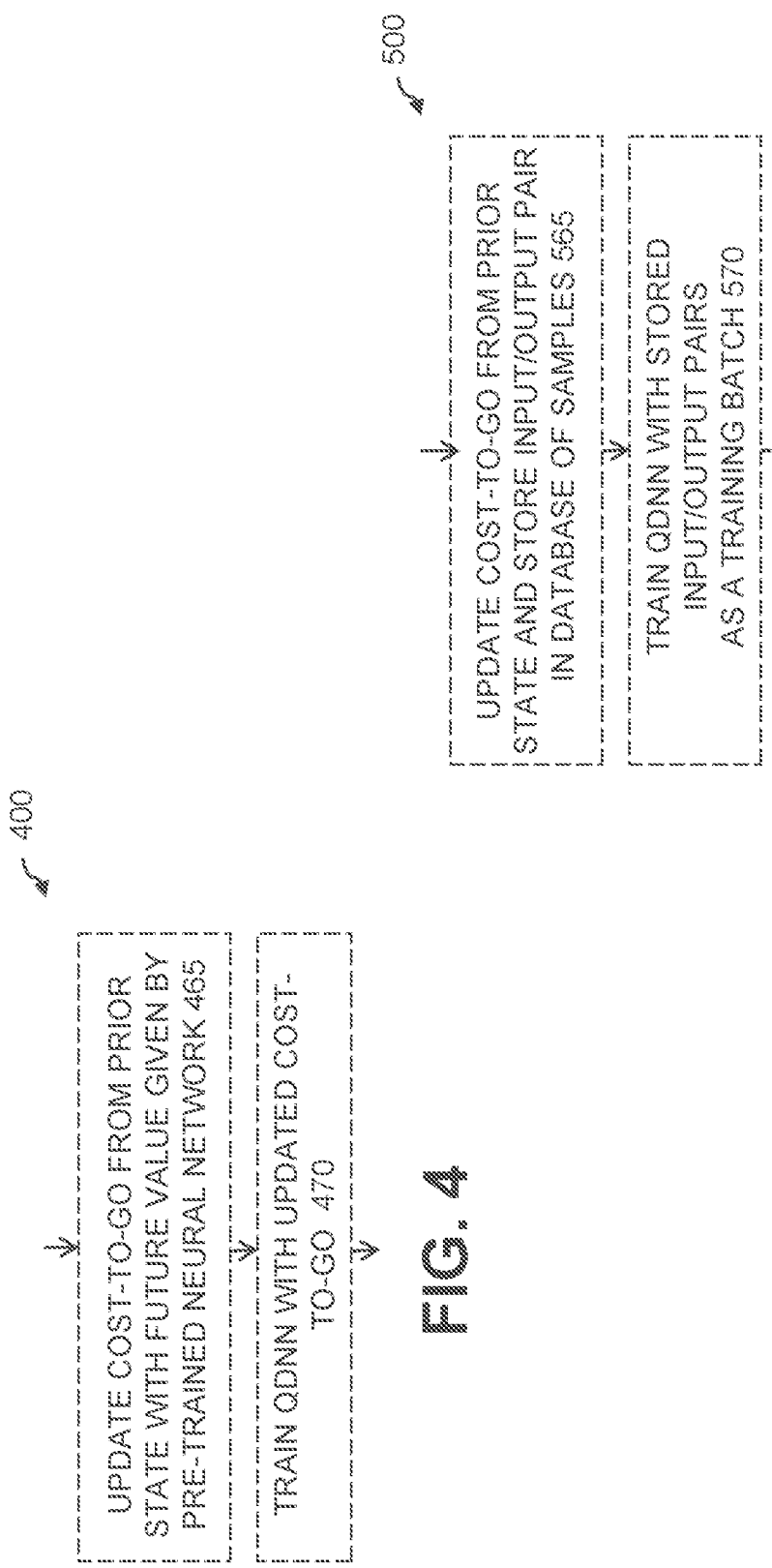

DEEP REINFORCEMENT LEARNING FOR WORKFLOW OPTIMIZATION

FIELD

The field relates generally to resource allocation techniques for a shared computing environment.

BACKGROUND

Modern industrial systems rely heavily on automated workflows to execute tasks, such as data mining, pattern recognition and image processing. Such workflows are typically executed in a shared infrastructure. The sharing of the infrastructure resources is a non-trivial task, which typically requires the orchestration of virtual machines whose setup directly impacts the time and the cost to execute the workflows. This problem is particularly relevant in the context of Infrastructure and Platform as a Service providers, where providing scalability and efficient resource allocation for the execution of these workflows is necessary in order to save costs.

One way to cope with the challenge of automated workflow execution in shared infrastructures is to charge users based on an amount of resources allocated to each workflow. One strategy comprises pre-allocating resources to each workflow before its execution, according to user-defined specifications. Nonetheless, a non-automated strategy for resource allocation is not optimal for the execution of automated workflows.

A need therefore exists for improved techniques for allocating resources for workflow execution in a shared computing environment.

SUMMARY

Illustrative embodiments of the present disclosure provide deep reinforcement learning techniques for resource allocation in a shared computing environment. In one embodiment, an exemplary method comprises: obtaining a specification of at least one workflow of a plurality of concurrent workflows in a shared computing environment, wherein the specification comprises a plurality of states of the at least one workflow and one or more control variables for the at least one workflow in the shared computing environment; evaluating a plurality of values of the control variables for an execution of the plurality of concurrent workflows using a reinforcement learning agent, wherein the evaluating comprises observing the plurality of states, including a current state comprising a current configuration of the plurality of concurrent workflows and the shared computing environment, and obtaining an expected utility score for a plurality of combinations of the control variables for the execution of the plurality of concurrent workflows given an allocation of resources of the shared computing environment corresponding to the combination of the control variables in the current state; and providing an allocation of the resources of the shared computing environment reflecting the combination of the control variables having the expected utility score that satisfies a predefined score criteria. The reinforcement learning agent is optionally updated by further training a model with the states that result from the allocation as new training samples.

In some embodiments, the reinforcement learning agent comprises a Deep Q-Learning agent using a Q-Deep Neural Network (QDNN) as a representation of a Q-Function, and wherein the obtaining the expected utility score for the plurality of combinations of the control variables comprises selecting an action at random and computing a cost-to-go from the expected utility score of the selected action updated by an observation of the current state, and wherein an updating of the at least one reinforcement learning agent comprises a training of the QDNN given new samples in iterative epochs. The values of the expected utility score are optionally given by predictions from a Deep Neural Network for a predefined number of training epochs. The expected utility score for the plurality of combinations of the control variables can optionally be obtained by updating the cost-to-go from a previous state with a future value given by a pretrained neural network. In another embodiment, the computation of a cost-to-go from the expected utility score of the selected action updated by the observation of the current state additionally comprises the storage of input/output pairs in a database of samples and wherein a training batch for the training of the QDNN is comprised of new samples from the database processed in iterative epochs.

Other illustrative embodiments include, without limitation, apparatus, systems, methods and computer program products comprising processor-readable storage media.

BRIEF DESCRIPTION OF THE DRAWINGS

FIGS. 4 and 5 are flow charts illustrating exemplary alternative implementations of portions of the exemplary Deep Q-Learning process of FIG. 3, according to some embodiments of the disclosure;

DETAILED DESCRIPTION

Figure 1:
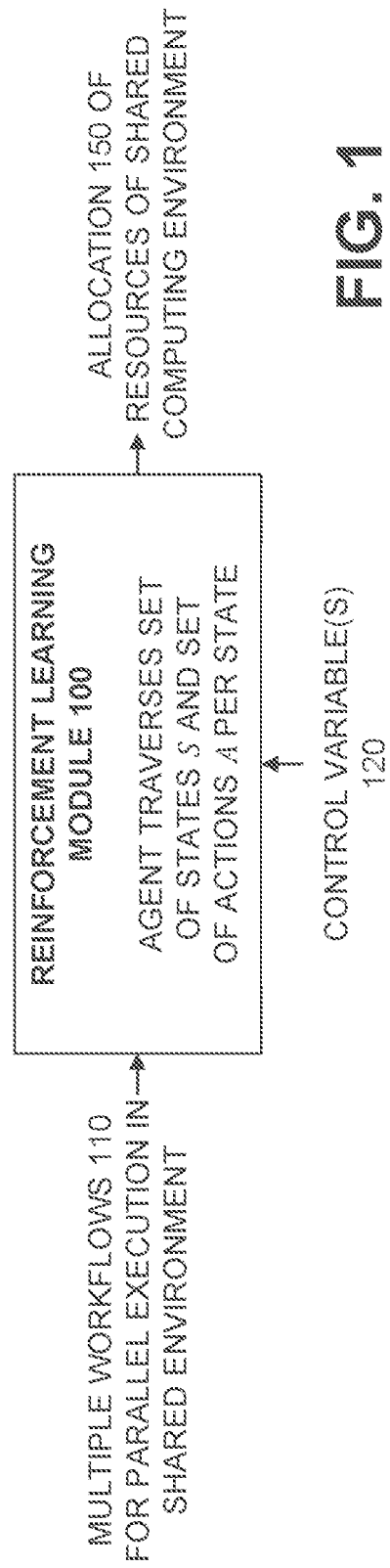
FIG. 1 illustrates an exemplary reinforcement learning module for workflow optimization, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for deep reinforcement learning-based resource allocation in a shared computing environment.

In one or more embodiments, dynamic resource allocation techniques are provided for workflow execution that learn how workflows behave under different infrastructure configurations, while at the same time reducing a waste of resources during a learning stage.

In some embodiments, reinforcement learning agents are employed to balance between the exploration of new configurations and the exploitation of known resource allocation policies. One or more embodiments of the present disclosure enable and enhance an application of reinforcement learning (RL) in the context of workflow optimization.

In this manner, RL techniques are employed for workflow optimization. To cope with a large state space, a neural network is used in some embodiments to represent the Q-function in a Q-Learning approach, based on an action-value function. Reinforcement learning techniques are used to process the exploration versus exploitation tradeoff. In at least one embodiment, Deep Q-Learning techniques are applied to the workflow optimization problem.

In one or more embodiments, the disclosed Deep Q-Learning approach employs a neural network to deal with the initialization of cost estimates and policy bootstrapping. The estimates from a neural network (configuring initial guesses for the value function) are used to parameterize the initial state of the reinforcement learning agent, mitigating the effect of the initial random estimates on convergence times.

In one embodiment, a replay train-on-batch mechanism is employed for deep reinforcement learning in the context of workflow optimization. Batches are composed for model training, which allows old data to be reused in future training epochs, and previous estimates of completion times to be combined with new samples.

In some embodiments, a deep neural network architecture is employed with one input (e.g., the current state) and multiple outputs (e.g., one output for each of the possible resource allocations) to represent the Q-value function. Each output characterizes the estimated cost-to-go for the completion of the execution of the workflows under the corresponding allocation.

While autonomous computing envisions automatically configuring a system so as to efficiently allocate its resources, reinforcement learning aims at automatically learning substantially optimal policies. Some embodiments provide reinforcement learning solutions for the workflow optimization problem by leveraging (1) machine learned models for cost initialization, (2) composition of batches of past experiences, and (3) a particular Deep Neural Network (DNN) architecture. The combination of these techniques enhances robustness and improves the convergence of the RL process.

One or more embodiments of the disclosure dynamically determine one or more control variables that impact a cost associated with the execution of a given workflow. Such variables include, for example, a number of processing cores and/or an amount of memory allocated to a given workflow. The impact of such variables on the cost is not assumed to be fully known in advance.

Some embodiments leverage control theoretic tools to address the problem of dynamic variable control for workflow optimization. Although many control theory tools for dynamic discrete system optimization exist, such tools usually assume that the dynamics of the system being considered are known. In particular, many of these solutions assume that the impact of control variables on the cost function are given. Reinforcement learning, on the other hand, does not rely on such assumptions. Nonetheless, there is still a challenge of mapping the workflow optimization problem into the reinforcement learning framework. In the following paragraphs, challenges related to the application of reinforcement learning in the workflow optimization problem are addressed.

The reinforcement learning process relies on the estimates of rewards associated with each action at each of the model states. These initial estimates of rewards can have a significant impact on the time that it takes for the learning algorithm to converge. For this reason, using prior knowledge about the system is often desirable. See, for example, E. Wiewiora, "Potential-Based Shaping and Q-Value Initialization are Equivalent," Journal of Artificial Intelligence Research, No. 19, 205-08 (2003).

In the context of workflow optimization, the reward typically configures a cost for the complete execution of the workflow(s) (e.g., a negative reward). These costs are not trivially known, and a method is needed both for the estimation of these costs and for leveraging this knowledge in initializing the estimates of the costs associated to actions at each state.

The training of a model typically requires many samples. Collecting this data from the real environment is often associated with errors, and may require the execution of workflows that take hours or days to complete. Ideally, executions for the sake of generating sample measurements alone should be avoided, and viable samples should be extrapolated, if possible.

Dealing with a large state space, whose cardinality increases exponentially with respect to the number of state variables, is challenging. A large state space implies large memory requirements and time complexity for the learning process.

Moreover, if the state space is large and sparse, each new execution of a workflow configures a new set of visited states. This makes the approach of applying reinforcement learning to learn a policy impractical. Thus, a representation that generalizes states (e.g., generalizes from previous samples) is needed in order to allow the reinforcement learning process to learn about states that have not been visited before.

This particular problem essentially precludes the application of table-based approaches (such as tabular Q-Learning) in practice, which require a finite state space for convergence.

Workflow Optimization

Consider the problem of workflow optimization in shared environments, especially from the point of view of Infrastructure as a Service (IaaS) providers. In IaaS environments, workflows are typical large-scale client applications, demanding large amounts of distributed computing resources. See, for example, L. P. Kaelbling et al., "Reinforcement Learning: A Survey," Journal of Artificial Intelligence Research, Vol. 4, 237-85 (1996); and/or V. Mnih et al., "Human-Level Control Through Deep Reinforcement Learning," Nature, Vol. 518, No. 7540, 529-33 (2015). The optimization problem in workflow executions in IaaS environments is defined in relation to one or more Quality of Service (QoS) metrics. The problem comprises assigning values to one or more control variables related to the usage and allocation of computational resources, in order to maximize one or more utility metrics derived from QoS metrics.

Control variables represent features that can be controlled by the resource manager of the execution environment.

Typically, in applications for decision making and optimization in IaaS environments, these variables are related to the usage and allocation of computational resources to certain tasks or workloads. The control variables are associated with the possible "actions" that the resource manager can take. In at least one embodiment, as in U.S. patent application Ser. No. 15/800,587, filed Nov. 1, 2017, entitled "Simulation-Based Online Optimization of Workflows," (now U.S. Pat. No. 11,004,025), incorporated by reference herein in its entirety, this corresponds to increasing or decreasing the number of processing cores allocated for the execution of a batch of workflows. In this sense, the possible values for the control variables limit and determine the transitions in a state space.

Considering the target QoS metrics as utility metrics, the workflow optimization problem in IaaS is defined as maximizing (or minimizing) utility (or negative utility) metrics over the execution of one or more workflows sharing and competing for computational resources. From the perspective of the service provider, an important aspect for optimization is to minimize resource allocation while still ensuring that Service Level Agreement (SLA) conditions are met. It is additionally assumed in some embodiments that one or more utility functions are defined, numerically representing preferences and tradeoffs in cost, execution time and other quality of service metrics. In one embodiment, as in U.S. patent application Ser. No. 15/800,587, filed Nov. 1, 2017, entitled "Simulation-Based Online Optimization of Workflows," (now U.S. Pat. No. 11,004,025), incorporated by reference herein in its entirety, the concept is exemplified with a negative utility metric of total execution cost, which directly relates to resource allocation (e.g., number of cores) and total execution time, and aims to substantially minimize the total running cost for a batch of concurrent workflows. To this end, the following cost function is used in one or more embodiments: given a number of allocated processing cores (the control variable in the exemplary domain) and the time to finish a workflow, the cost function yields the total execution cost for the processing of that workflow with that number of cores.

Reinforcement Learning

As noted in the Survey referenced above, Reinforcement Learning is a technique within the machine learning field in which virtual agents take actions so as to substantially maximize a cumulative reward. Reinforcement Learning differs from other supervised learning techniques in that it does not rely on labeled complete input-output samples (e.g., there's no strict need for providing complete examples where the output for each input is known a priori). Instead, Reinforcement Learning seeks to substantially optimize the process at each decision step by balancing exploration of states (possibly still unknown) and exploration of the current best guess. The output of a Reinforcement Learning solution is typically a policy determining the substantially optimal action at each possible state within the environment.

A Reinforcement Learning application defines the following aspects: the environment, the agent, the actions available to the agent, and the reward for each action. Several possible techniques exist, such as SARSA (State Action Reward State Action) or Q-Learning (based on an action-value function). In one or more embodiments of the present disclosure, the Q-Learning technique is employed. In particular, an application of the Deep Q-Learning technique is employed, as discussed further below.

The exemplary system model comprises an agent, a set of states S and a set of actions per state A. By performing an action $a \in A$, the agent can move between states. Executing an action in a specific state provides the agent with a reward (e.g., a numerical score). The goal of the agent is to maximize its total reward. The agent does this by learning which action is substantially optimal for each state. The action that is substantially optimal for each state is the action that has the highest long-term reward. This reward is a discounted sum of the expected values of the rewards of all future steps starting from the current state. The discount factor $\gamma$ is a number between 0 and 1 and is called the discount factor and trades off the importance of sooner versus later rewards. $\gamma$ may also be interpreted as the likelihood to succeed (or survive) at every step.

The exemplary algorithm therefore estimates a function that determines the quality of a state-action combination:

$$Q: S \times A \mapsto \mathbb{R}. \quad (1)$$

Before learning has started, Q returns an (arbitrary) fixed value, chosen by the designer. Then, at each possible time t the agent selects an action $a_t$, observes a reward $r_t$ and a new state $s_{t+1}$ that may depend on both the previous state $s_t$ and the selected action. The core of the algorithm is a simple value iteration update, using the weighted average of the old value and the new information. The Q-function is updated as follows:

$$Q(s_t, a_t) \leftarrow (1-\alpha)\underbrace{Q(s_t, a_t)}_{\text{Old value}} + \underbrace{\alpha}_{\substack{\text{Learning} \\ \text{rate}}} \underbrace{\left( \underbrace{r_t}_{\text{Reward}} + \underbrace{\gamma}_{\substack{\text{Discount} \\ \text{factor}}} \underbrace{\max_a Q(s_{t+1}, a)}_{\text{Estimate of optimal future value}} \right)}_{\text{Learned Value}}, \quad (2)$$

where $r_t$ is the instantaneous reward observed for the current state $s_t$ and $\alpha$ is the learning rate ($0 < \alpha \leq 1$).

An episode or epoch of the algorithm ends when a state $s_{t+1}$ is a final state (or, "absorbing state"). However, Q-learning can also learn in non-episodic tasks. If the discount factor is lower than 1, the action values are finite even if the problem can contain infinite loops.

Thus, after running a certain number of epochs, the Q function converges and taking the $$\max_a Q(s_t, a)$$

yields the substantially optimum policy for each state.

As discussed above, the deployment of reinforcement learning solutions poses a number of challenges in a practical workflow optimization setup. First, if the state space cardinality is large, or infinite, the convergence of the Q function towards its fixed point may be very time consuming. To fix this problem, a number of recent advances indicate ways to circumvent the convergence problem. Some of these strategies involve the use of Deep Q-Learning, as discussed in V. Minh, referenced above.

In the following discussion, portions of the Deep Q-Learning literature are adapted to the workflow optimization setting. In particular, a deep neural network is trained and used to estimate a quality of each state-action pair.

Deep-Reinforcement Learning for Workflow Optimization

One or more embodiments of the disclosure apply reinforcement learning techniques to the workflow optimization problem. This technique has been successfully applied to several distinct problems in other contexts, as discussed in the referenced Survey, and proofs of convergence of the technique hold under mild assumptions. See, for example, R. S. Sutton and A. G. Barto, "Reinforcement Learning: an Introduction," Cambridge: MIT Press (1998). In the following discussion, an effective and efficient approach is described to apply reinforcement learning to solve the workflow optimization problem.

Reinforcement Learning for Workflow Optimization

In this section, a reinforcement learning solution is described for the problem of setting environmental control variables (e.g., amount of memory and number of CPU (central processing unit) cores) aiming at a substantially optimal workflow execution. In particular, the exemplary embodiments focus on a class of reinforcement learning solutions known as Q-Learning.

FIG. 1 illustrates an exemplary reinforcement learning module 100 for workflow optimization, according to an embodiment of the disclosure. In the exemplary setup of FIG. 1, the execution of multiple workflows 110 in parallel is considered. As noted above, an agent traverses a set of states S and a set of actions A per state. The system state is given by the telemetry metrics of the machines executing the workflows and the execution state of each of the workflows at each instant. In a cloud environment, for example, the system state comprises the set of telemetry metrics collected from all the machines running the workflows of interest. The system state, together with a corresponding control variable 120, is assumed to contain the information required to determine the next state.

At each state, the agent can perform actions that affect the environment and that impact the immediate cost and the transition towards the next state. In the exemplary setup, the three exemplary actions available comprise setting the number of processing cores to 2 cores, 4 cores or 12 cores. The agent is in charge of determining, at each decision opportunity, whether to maintain the current system configuration or to act towards a change in the number of cores. An epoch is defined in some embodiments as the duration of time between the start of the execution of a batch of workflows and the completion of the execution of the workflows in the batch.

In some embodiments, the exemplary reinforcement learning module 100 generates an allocation 150 of one or more resources of the shared computing environment, as discussed further below.

If state variables are discretized, the state space cardinality grows exponentially with respect to the number of state variables. In addition, note that certain state variables, such as the CPU usage, best fit into a continuous representation. The large cardinality of the state space, or its infinite dimension, implies that states are usually not revisited in between epochs. This motivates the use of Deep Q-Learning, wherein a deep neural network represents the value function which maps states into their corresponding values. The use of neural networks as a function approximator to represent the value function addresses the challenge of dealing with a state space with large cardinality, or an infinite state space, by leveraging correlations between state features and corresponding state values.

Figure 2:
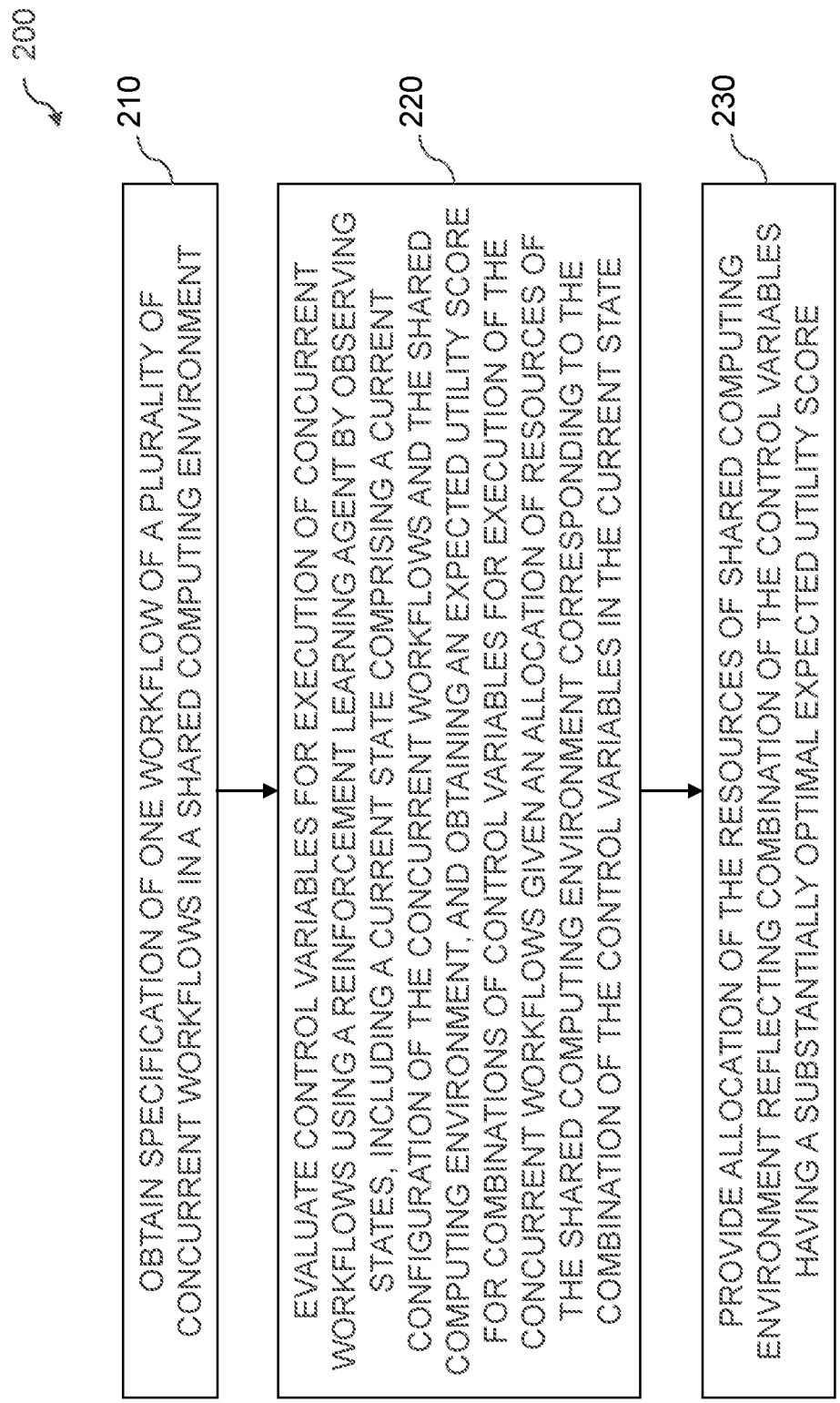
FIG. 2 is a flow chart illustrating an exemplary implementation of a reinforcement learning process for workflow optimization, according to one embodiment of the disclosure.

FIG. 2 is a flow chart illustrating an exemplary implementation of a reinforcement learning process 200 for workflow optimization, according to one embodiment of the disclosure. As shown in FIG. 2, the exemplary reinforcement learning process 200 initially obtains a specification of at least one workflow of a plurality of concurrent workflows in a shared computing environment. In one or more embodiments, the specification obtained in step 210 comprises a plurality of states observed over time of the at least one workflow and control variables for the at least one workflow in the shared computing environment.

During step 220, the exemplary reinforcement learning process 200 evaluates a plurality of values of the control variables for an execution of the plurality of concurrent workflows using at least one reinforcement learning agent. In some embodiments, the evaluating comprises observing the states, including a current state comprising a current configuration of the concurrent workflows and the shared computing environment, and obtaining an expected utility score for a plurality of combinations of the control variables for the execution of the plurality of concurrent workflows, given an allocation of resources of the shared computing environment corresponding to the combination of the control variables in the current state.

Finally, during step 230, the reinforcement learning process 200 provides an allocation of the resources of the shared environment reflecting the combination of the control variables having the expected utility score that satisfies a predefined score criteria (e.g., a substantially optimal expected utility score).

Deep Q-Learning for Workflow Optimization

Figure 3:
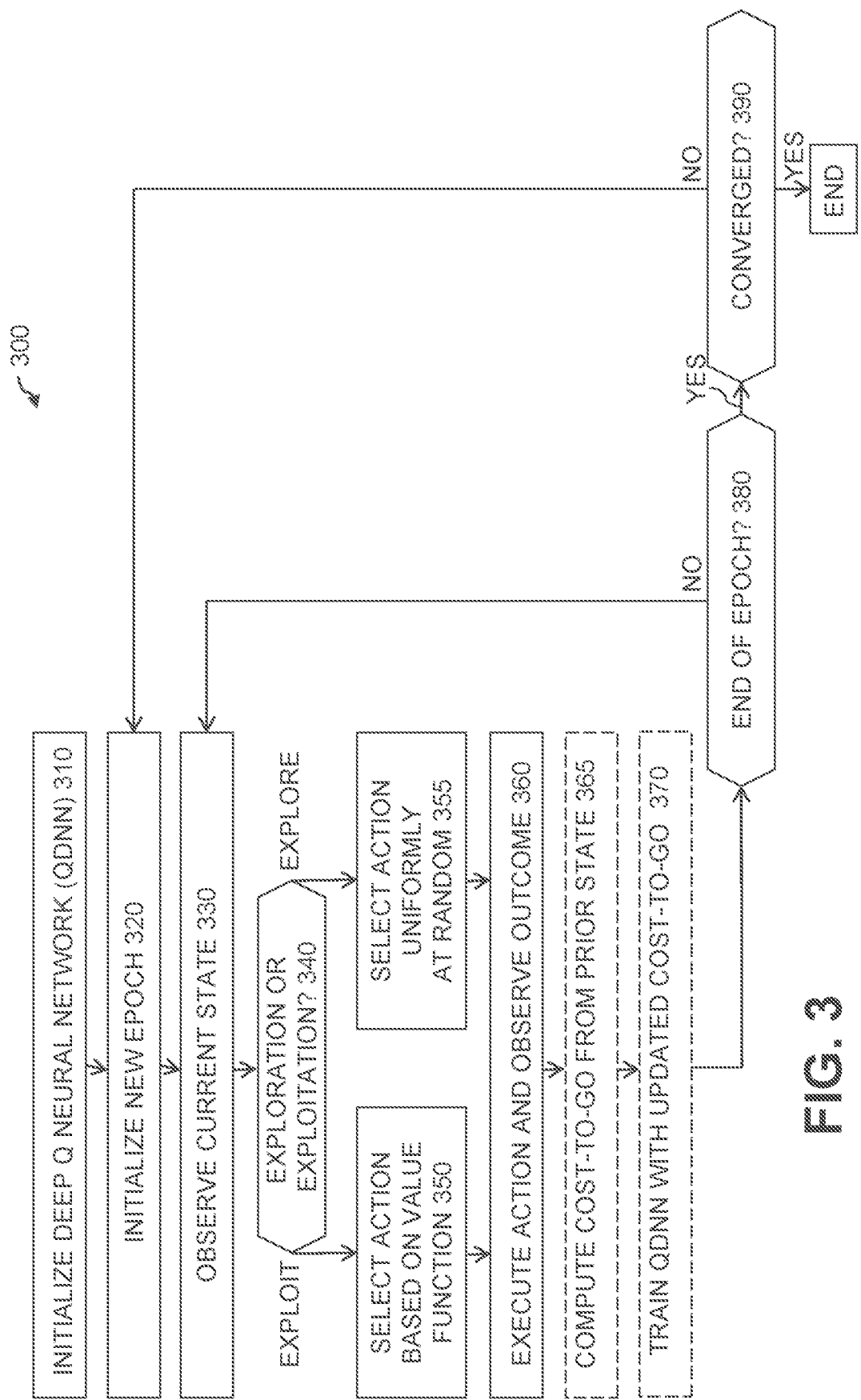
FIG. 3 is a flow chart illustrating an exemplary Deep Q-Learning process for the workflow optimization problem, according to an embodiment.

In this section, the use of a Deep Neural Network (DNN) implementation of the reinforcement learning module 100 of FIG. 1 under a Deep Q-Learning for workflow optimization is described. FIG. 3 is a flow chart illustrating an exemplary Deep Q-Learning process 300 for the workflow optimization problem, according to an embodiment.

As shown in FIG. 3, the exemplary Deep Q-Learning process 300 initializes a deep Q neural network (QDNN) model with arbitrary weights during step 310. These weights are updated after each training phase. Generally, a QDNN maps a given system state into a set of values representing the "cost-to-go" associated with a given action at that state. The QDNN is a function approximator to the Q function, Q: $(s, a) \rightarrow Q(s, a)$ where s and a are a state and an action, respectively, and $Q(s, a)$ is the estimated cost-to-go associated to executing action a at state s. By jointly producing as outputs the estimates of the cost-to-go for all possible actions at state s, the DNN captures correlations between features, actions and costs which otherwise would not have been accounted for.

Next, the exemplary Deep Q-Learning process 300 initializes a new epoch during step 320. In the context of the workflow optimization problem, an epoch is defined as corresponding to the execution of a batch of workflows. The epoch is initialized by the creation of a new environment. At initialization, the time $\tau$ between decision opportunities is determined, i.e., the time interval in between opportunities to modify the control variables, corresponding to the definition of the simulation resolution.

The execution of actions throughout the epoch is then configured in steps 330 through 370 (e.g., after each interval of $\tau$ time units, until the end of the epoch). In step 330, the current state of the system is observed.

Step 340 configures the choice of exploration or exploitation: the agent needs to decide between taking the optimal action given its acquired knowledge (exploitation) or exploring new (potentially better) actions and opportunities (exploration). To choose between the two options, an exploration-exploitation threshold between (0,1) is determined. Then, a number is sampled uniformly at random in that range, and if the number is smaller (resp., larger) than the threshold, exploration (resp., exploitation) is taken.

In step 355, the agent selects a random action from those available in the current state (from step 330) if exploration is taken in step 340. However, if exploitation is taken in step 340, then the agent consults the DNN to select the action so far considered the best at the current state based on the value function during step 350. The agent first determines the current telemetry information and the state of all executing workflows, combining them into the current state. The current state is then fed to the DNN, which outputs a vector of cost-to-go values associated to all the possible actions. The optimal action can then be chosen by selecting the action which yields the minimum cost-to-go.

Notice that, in the first iterations, the decision between exploitation and exploration during step 340 is unimportant. Since the QDNN yields values highly influenced by its (random) initialization, the agent selects roughly arbitrary actions until later iterations, where the QDNN starts to converge and the de facto best actions start to yield better results.

In step 360, the selected action is executed and its outcome in the environment is observed and recorded. After an action is executed, the agent transitions to its next state, and a given instantaneous cost is incurred. This cost is associated to the cost of maintaining the current infrastructure in between the visit to the first state and the transition to the next state. In one setup, the instantaneous reward (negative cost) at time t is given by:

$$r_t(s_t, a_t) = -(c_t(s_t)\tau + h_t(s_t, a_t)),$$

where $c_t$ is the cost per time unit associated to the infrastructure maintained at state $s_t$, and $h_t(s_t, a_t)$ is the cost of changing the infrastructure from the one associated to $s_t$ to that determined by $a_t$. By setting the reward equal to the negative cost, a minimization problem is translated into a maximization problem.

Recall equation (2) from above:

$$Q(s_t, a_t) \leftarrow (1-\alpha)\underbrace{Q(s_t, a_t)}_{\text{Old value}} + \underbrace{\alpha}_{\text{Learning rate}} \underbrace{\left( \underbrace{r_t}_{\text{Reward}} + \underbrace{\gamma \max_a Q(s_{t+1}, a)}_{\substack{\text{Discount} \\ \text{factor Estimate of optimal} \\ \text{future value}}} \right)}_{\text{Learned Value}}, \quad (2)$$

In step 365, the cost-to-go y is given by the current state, an action and estimate of the Q function. Note that while estimating the last term in the equation above, the DNN is used to assess the best action a at the next state $s_{t+1}$. Initially, this assessment is random, as it is based on a QDNN initialized with weights set uniformly at random.

Finally, at step 370, the QDNN is trained with samples collected from the execution of actions and their corresponding cost-to-go. The samples are of the format $(s_t, a_t, r_t, s_{t+1})$. Given a set of samples and corresponding cost-to-go values, the DNN is trained using a gradient descent method. In the simplest case, after each sample is collected, the DNN is retrained using that sample.

A test is performed during step 380 to determine if the end of the epoch has been reached. If it is determined during step 380 that the end of the epoch has not been reached, then program control returns to step 330, otherwise program control proceeds to step 390.

A test is performed during step 390 to determine if the QDNN has converged. If it is determined during step 390 that the QDNN has not converged, then program control returns to step 320, otherwise program control ends.

It is noted that steps 365 and 370 have a dashed outline to indicate that one or both of these steps are replaced by alternative steps for alternate implementations of the exemplary Deep Q-Learning process 300, as discussed further below in conjunction with FIGS. 4 and 5.

Leveraging Machine Learned Models for Cost Initialization

In one or more embodiments, a cost initialization strategy is employed that leverages the predictions from a pre-trained Deep Neural Network (DNN), such as the one described in U.S. patent application Ser. No. 15/364,449, filed Nov. 30, 2016, entitled "Snapshots to Train Prediction Models and Optimize Workflow Execution," (now U.S. Pat. No. 10,909, 503) incorporated by reference herein in its entirety.

Cost Initialization Using Provenance Data

Relying on the collection of provenance data, the predictions from the pre-trained DNN, are used to predict the mean cost to complete a workflow. In this case, it is assumed that actions will remain fixed and given while a workflow is executed (e.g., a static control policy). This approximation serves exclusively to initialize the cost-to-go estimates, and is relaxed as the algorithm is executed. The estimates under the static control policy can be captured by a neural network referred to as NN1. The neural network NN1 is used in the first iterations of the reinforcement learning algorithm (e.g., while the target QDNN is still random) to assess the cost-to-go that appears in the right-hand side of equation (2), and is eventually replaced by the target QDNN.

Q-Value Updates and Cost Initialization

The literature of reinforcement learning indicates that subtle changes in the way the Q-value function is updated may cause significant changes in the resulting outcome. SARSA, for instance, slightly modifies the Q-learning basic equation to account for the impact of exploration on the value obtained at any given state. To this aim, SARSA replaces the maximum operator in the update of the Q-value at a given state s (see equation (2)) by the value effectively obtained after an action is taken at the subsequent state. For a more detailed discussion, see, for example, R. S. Sutton and A. G. Barto, "Reinforcement Learning: an Introduction," Cambridge: MIT Press (1998). In multiple case studies, SARSA has presented higher levels of robustness when compared against Q-learning.

Similarly, one or more embodiments of the present disclosure replace the maximum operator in the right-hand side of equation (2) by alternative estimates of the cost-to-go, especially during bootstrap. As mentioned above, one of such proposals comprising replacing the maximum operator in the right-hand side of equation (2) by the cost-to-go as estimated by a previously trained neural network which assesses the cost-to-go without accounting for infrastructure changes during the execution of a workflow. FIG. 4 is a flow chart illustrating an exemplary alternative implementation 400 of portions of the exemplary Deep Q-Learning process 300 of FIG. 3, according to one embodiment of the disclosure. As shown in FIG. 4, the exemplary alternative implementation 400 replaces step 365 from FIG. 3 with the step of updating the cost-to-go from a prior state with a future value given by the pre-trained neural network in step 465. In step 470, the QDNN is trained with samples collected from the execution of actions and their corresponding cost-to-go, in the same manner as step 370 of FIG. 3. The other steps of the alternative implementation 400 may be implemented in a similar manner as the corresponding steps of the exemplary Deep Q-Learning process 300 of FIG. 3.

Alternatively, one can consider the direct explicit modification of the policy rather than changing the Q-value function. Such explicit policy modifications may be simpler to deploy and interpret. Combining different approaches may speed up convergence.

Robustness in Deep Q Learning for Workflow Optimization

Leveraging Batches of Past Experiences to Reduce Outlier Effects

During the execution of a workflow, the application of the exemplary Deep Q-Learning process 300 described in conjunction with FIG. 3 may lead to outliers due to noisy data collection. For instance, the state of the machine may be affected by exogenous factors, the machine may halt for a while or execute background processes such as updates which impact the execution of the running workflows. Such confounding factors may impact the telemetry of the current state, which in turn will affect the weights of the QDNN during training steps.

To avoid significant impact of outliers, training is executed using batches of samples rather than single samples. FIG. 5 is a flow chart illustrating an exemplary alternative implementation 500 of portions of the exemplary Deep Q-Learning process 300 of FIG. 3, according to an embodiment of the disclosure. As shown in FIG. 5, the exemplary alternative implementation 500 replaces steps 365 and 370 from FIG. 3 with steps 565 and 570. Step 565 updates the cost-to-go from a prior state and stores the input/output pair in a database of samples. Old samples are evicted, to account for non-stationary environments. In step 570, the QDNN is trained with stored samples input/output pairs from the database as a training batch. In this manner, training is executed using a batch of samples selected at random from the database of samples. Such training on batch builds robustness, as outliers will not significantly influence the weights of the QDNN provided that most of the elements of the batch are well behaved samples. The other steps of the alternative implementation 500 may be implemented in a similar manner as the corresponding steps of the exemplary Deep Q-Learning process 300 of FIG. 3.

Robust QDNN Architecture with One Output Value Per Action

Consider a QDNN to approximate the value function. The training of the QDNN requires the generation of a set of samples, to be fed into the QDNN as a batch. The training process can be represented as a function that receives as input the set of samples and the current weights that configure the QDNN, and generates as output a new set of weights resulting from the training.

Each of these samples configures a four-tuple (s, s', a, r) characterizing the immediate reward r observed after executing action a at state s, causing the system to transition into state s'.

Figure 6:
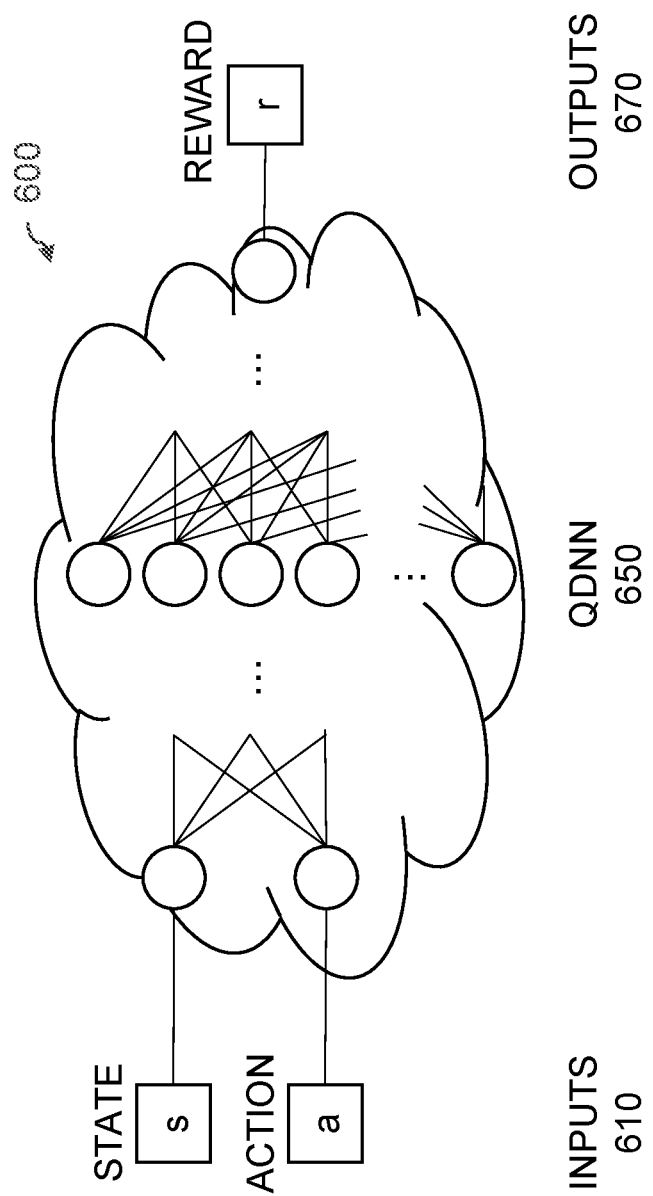
FIG. 6 illustrates an exemplary QDNN architecture for reinforcement learning-based resource allocation, according to an embodiment of the disclosure.

FIG. 6 illustrates an exemplary QDNN architecture 600 for reinforcement learning-based resource allocation, according to an embodiment of the disclosure. As shown in FIG. 6, the QDNN architecture 600 comprises a QDNN 650 that receives as input 610 a state, s, and an action, a, and yields as outputs 670 the corresponding reward, r, for that action, consistent with the formulation of equation (2).

Consider the running example of the system with three available actions at each state (e.g., assigning 2, 4 or 12 processing cores), and let r1, r2 and r3 be the reward estimates yielded by the QDNN, one for each respective action, in a given state s1. In equation (2), obtaining the estimate of optimal future value requires the analysis of the rewards of all actions at each state. Hence, in the architecture of a QDNN 650 of FIG. 6, three separate invocations of the QDNN 650 are necessary.

Figure 7:
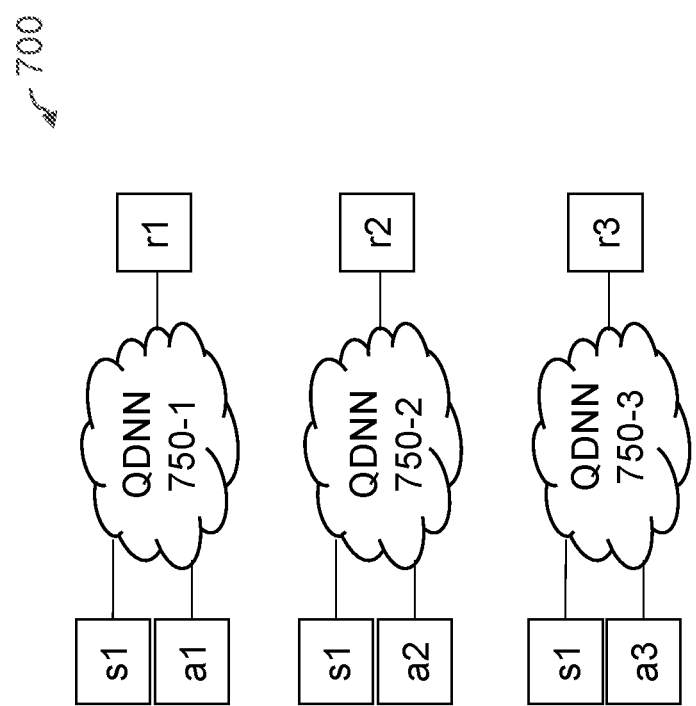
FIG. 7 illustrates multiple invocations of the exemplary QDNN architecture of FIG. 6 for reinforcement learning-based resource allocation, according to some embodiments of the disclosure.

FIG. 7 illustrates multiple invocations 700 of the exemplary QDNN architecture of FIG. 6 for reinforcement learning-based resource allocation, according to some embodiments of the disclosure. As shown in FIG. 7, the QDNN is invoked three times, as represented by QDNN 750-1, 750-2 and 750-3 to evaluate the three available actions a1 through a3 (e.g., assigning 2, 4 or 12 processing cores) at a current state, s1, in order to obtain three corresponding rewards r1 through r3, one for each available action a1 through a3.

The approach shown in FIG. 7 is appropriate for cases in which the action space is continuous (and there are, therefore, an infinite number of possible actions at each state) or when the set of available actions is not known beforehand. However, the architecture of FIG. 7 does not take advantage of correlations between state features and multiple actions in an integrated fashion. Note that whereas (s, s', a, r) characterizes a local and 'myopic' perspective of the system dynamics, the samples that are fed into the QDNN 650 should ideally account for a global and long-term perspective.

Figure 8:
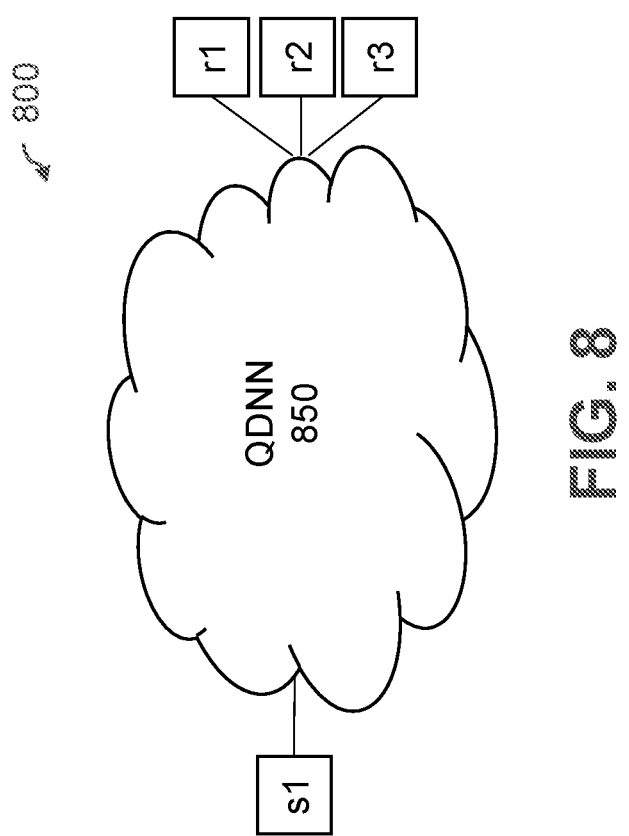
FIG. 8 illustrates an exemplary alternative QDNN architecture for reinforcement learning-based resource allocation, according to an embodiment of the disclosure

FIG. 8 illustrates an exemplary alternative QDNN architecture 800 for reinforcement learning-based resource allocation, according to an embodiment of the disclosure. The exemplary alternative QDNN architecture 800 comprises a QDNN 850, in a similar manner as FIG. 6. Given a domain with a finite number of known actions, the exemplary QDNN 850 receives as input only the current state, s1, and generates multiple outputs, r1 through r3, each representing the reward of one action in the current state, s1. For the exemplary alternative QDNN architecture 800 of FIG. 8, only one invocation of the QDNN 850 is necessary in order to obtain the rewards for all actions in that configuration.

In the configuration of FIG. 8, the training process considers substantially all weights to change in accordance to substantially all rewards at once. This promotes the robustness of the predictions of the rewards by the QDNN 850 with respect to each other. Notice, however, that in the configuration of FIG. 8, samples are considered of the format (s, $r_a$, ..., $r_z$), referred to as 'far-sighted' samples.

The generation of far-sighted samples from myopic samples is obtained using equation (2), replacing the application of function Q in the right-hand side of equation (2) by assessments of state values obtained by querying the QDNN 850. Given (s, s', a, r), one queries the QDNN 850 to obtain the current values of r1, r2 and r3 associated with state s and values r1', r2' and r3', associated with state s'. Let (s, r1, r2, r3) denote the original far-sighted sample. For the sake of concreteness, let a be the second action in the roster. Then, one recomputes the estimate of the far-sighted reward associated with action 2 at state s using equation (2). Let N2 be the new estimate. From equation (2), N2=$(1-\alpha)$r2+$\alpha$*(r+$\gamma$*max(r1', r2', r3')). The new estimate of the far-sighted tuple corresponding to state s is then given by (s, r1, n2, r3).

Note that the original far-sighted vector (s, R1, R2, R3) is modified exclusively at the entry corresponding to action a, accounting for the Q-learning basic equation (2), to obtain (s, R1, N2, R3). The vector (R1, N2, R3) is then set as the QDNN target corresponding to input state s. The process is repeated for multiple (s, s', a, r) myopic samples. After building the set of far-sighted QDNN samples, the batch of QDNN samples is used to retrain the QDNN in the alternative QDNN architecture of FIG. 8.

In summary, this process of training a QDNN 850 comprises (1) selecting a set of (s, s', a, r) myopic samples from the database of samples; (2) transforming each of such samples into a far-sighted QDNN sample, as described above; and (3) running a gradient descent on the QDNN 850 using the QDNN samples.

Elastic Resource Allocation Over Time

The demand for resources during a workflow execution typically varies over time. For example, there are tasks in seismic workflows that are CPU-bound while other tasks are input/output-bound. Thus, it is reasonable to assume that resource allocation should vary over time to make a more efficient use of the underlying infrastructure. Taking advantage of the elasticity of clouds, in the aforementioned example, more CPU power could be assigned to the workflow execution only during the execution of the CPU-bound tasks. One or more embodiments of the present disclosure identify a policy to do the proper resource allocation according to the workflow needs.

Load Balancing

Resources might get overloaded as new workflows are submitted for execution. Consider a number of jobs being executed on several servers and each job is at a different state. As one or more servers might be busier than others, it may be necessary to redistribute tasks among the servers and/or to use new servers. However, there is a cost associated to such task migration. It is therefore important to find a substantially optimal policy to update the task-to-resource allocation, minimizing the cost.

The execution of automated workflows is one of the building blocks of modern systems, especially relevant for the management of resources in Infrastructure as a Service (IaaS) environments. The automatic configuration of the infrastructure used to run the workflows involves the sharing of resources among multiple workflows, as multiple workflows are commonly executed in parallel in the same platform.

In one or more embodiments, the present disclosure provides reinforcement learning-based solutions for dynamic allocation of resources to execute automated workflows. In some embodiments, the RL agent aims at substantially minimizing the expected cost to execute a workflow, which depends on the completion time and the amount of resources allocated. One or more embodiments provide a detailed methodology for substantial minimization of workflow execution costs in IaaS environments through RL, leveraging (1) machine learned models for cost initialization, (2) composition of batches of past experiences, and/or (3) a particular DNN architecture. The combination of these techniques enhances robustness and speeds up the convergence of the RL process.

Among other benefits, the disclosed deep reinforcement learning techniques provide an improved resource allocation for concurrent workflows executing in a shared computing environment.

One or more embodiments of the disclosure provide improved methods, apparatus and computer program products for deep reinforcement learning-based resource allocation in a shared computing environment. The foregoing applications and associated embodiments should be considered as illustrative only, and numerous other embodiments can be configured using the techniques disclosed herein, in a wide variety of different applications.

It should also be understood that the disclosed resource allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for deep reinforcement learning-based resource allocation in a shared computing environment may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource allocation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
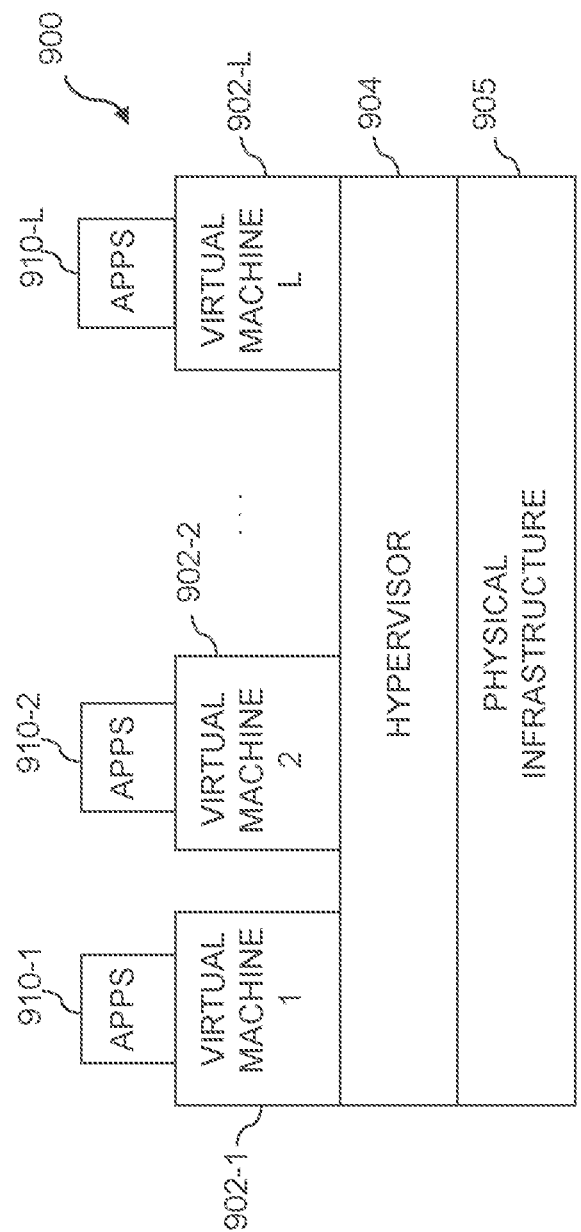
FIG. 9 illustrates an exemplary processing platform that may be used to implement at least a portion of one or more embodiments of the disclosure comprising a cloud infrastructure.

Referring now to FIG. 9, one possible processing platform that may be used to implement at least a portion of one or more embodiments of the disclosure comprises cloud infrastructure 900. The cloud infrastructure 900 in this exemplary processing platform comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

The cloud infrastructure 900 may encompass the entire given system or only portions of that given system, such as one or more of client, servers, controllers, or computing devices in the system.

Although only a single hypervisor 904 is shown in the embodiment of FIG. 9, the system may of course include multiple hypervisors each providing a set of virtual machines using at least one underlying physical machine. Different sets of virtual machines provided by one or more hypervisors may be utilized in configuring multiple instances of various components of the system. An example of a commercially available hypervisor platform that may be used to implement hypervisor 904 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the cloud-based resource allocation engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed cloud-based resource allocation apparatus may each run on a computer, server, storage device or other processing platform element. A given such element may be viewed as an example of what is more generally referred to herein as a "processing device." The cloud infrastructure 900 shown in FIG. 9 may represent at least a portion of one processing platform.

Figure 10:
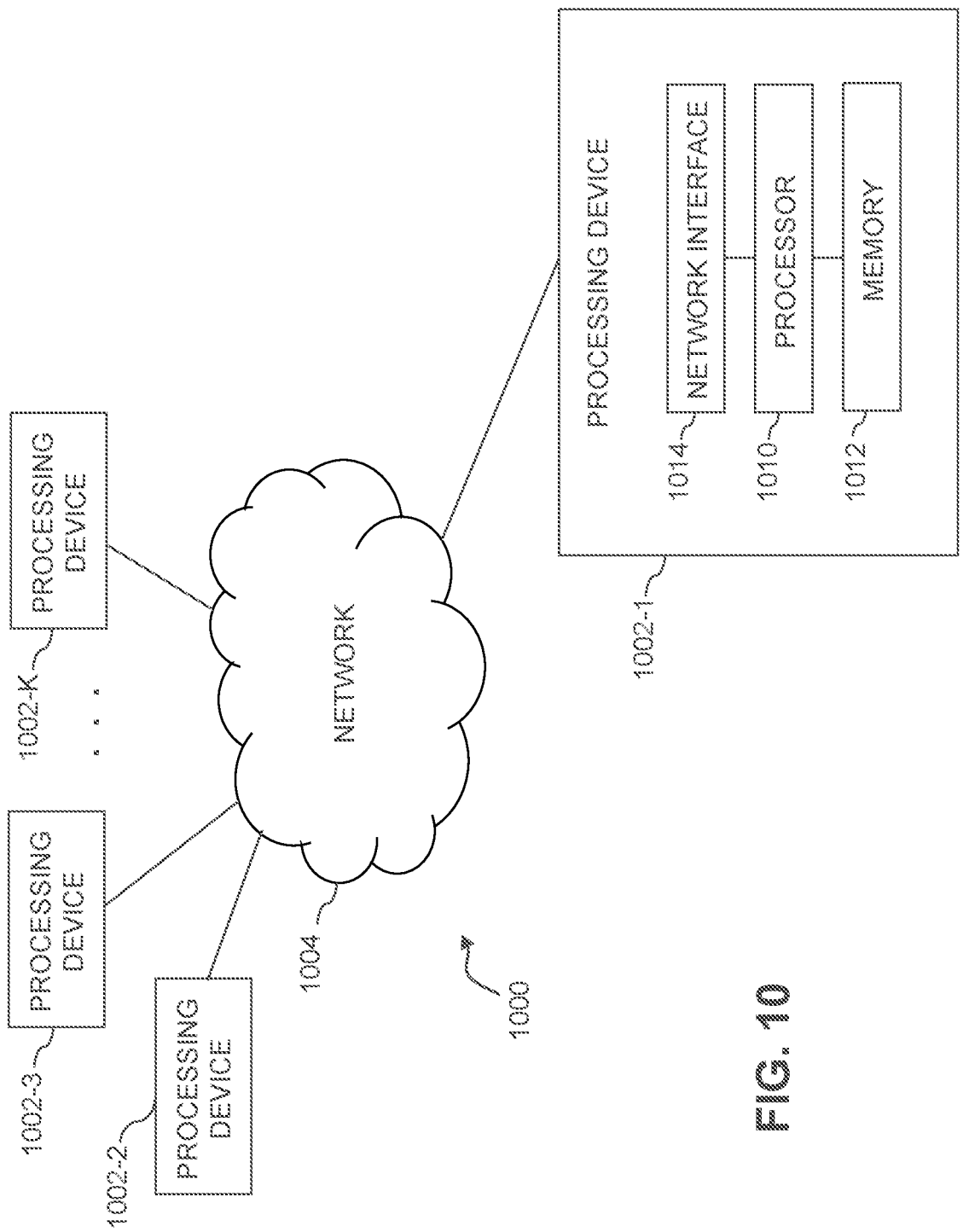
FIG. 10 illustrates another exemplary processing platform that may be used to implement at least a portion of one or more embodiments of the disclosure.

Another example of a processing platform is processing platform 1000 shown in FIG. 10. The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining a specification of a plurality of concurrent workflows in a shared computing environment, wherein the specification of a given one of the plurality of concurrent workflows comprises a plurality of states of the given workflow and one or more control variables indicating an allocation of one or more resources for the given workflow in the shared computing environment;
   evaluating, using at least one processing device, a plurality of values of the one or more control variables indicating the allocation of the one or more resources, for an execution of said plurality of concurrent workflows, using at least one reinforcement learning agent, wherein said evaluating comprises observing said plurality of states, including a current state comprising a current configuration of said plurality of concurrent workflows and said shared computing environment, and obtaining, from the at least one reinforcement learning agent, an expected utility score for a plurality of combinations of said control variables for the execution of said plurality of concurrent workflows given an allocation of the one or more resources of the shared computing environment corresponding to said combination of said control variables in said current state, wherein the at least one reinforcement learning agent traverses said plurality of states and is trained to select a particular action for a given state, wherein the particular action corresponds to the allocation of the one or more resources of the shared computing environment for the given state; and
   initiating an adjustment of the allocation of the one or more resources of the shared computing environment reflecting the combination of the control variables having the expected utility score, from the at least one reinforcement learning agent, that satisfies one or more predefined score criteria.

2. The method of claim 1, further comprising the step of applying the allocation of the one or more resources of the shared environment.

3. The method of claim 1, further comprising the step of updating said at least one reinforcement learning agent by further training a model with the states that result from said allocation as new training samples.

4. The method of claim 1, wherein said expected utility score further comprises an expected cost depending on one or more of an execution time of the given workflow and a consumption of resources in said shared computing environment.

5. The method of claim 1, wherein said states further comprise provenance data of said plurality of workflows.

6. The method of claim 1, wherein said states further comprise telemetry data of said shared computing environment.

7. The method of claim 1, wherein said at least one reinforcement learning agent comprises a Deep Q-Learning agent using a Q-Deep Neural Network (QDNN) as a representation of a Q-Function, and wherein said obtaining the expected utility score for the plurality of combinations of said control variables comprises selecting an action at random and computing a cost-to-go from the expected utility score of the selected action updated by an observation of the current state, and wherein an updating of the at least one reinforcement learning agent comprises a training of the QDNN given new samples in iterative epochs.

8. The method of claim 7, wherein the values of the expected utility score are given by predictions from a Deep Neural Network for a predefined number of training epochs.

9. The method of claim 7, wherein the obtaining the expected utility score for the plurality of combinations of said control variables further comprises the step of updating the cost-to-go from a previous state with a future value given by a pretrained neural network.

10. The method of claim 7, wherein said computation of the cost-to-go from the expected utility score of the selected action updated by the observation of the current state additionally comprises the storage of input/output pairs in a database of samples and wherein a training batch for said training of the QDNN is comprised of new samples from the database processed in iterative epochs.

11. The method of claim 7, wherein estimates of substantially optimal future values in said computation of the cost-to-go from the expected utility score of the selected action updated by the observation of the current state are given by the outputs of the QDNN with an architecture that yields multiple outputs configuring the expected utility scores for substantially all actions.

12. The method of claim 1, wherein the one or more control variables comprise one or more of a number of processing cores allocated to a given workflow and an amount of memory allocated to the given workflow.

13. A system, comprising:
a memory; and
at least one processing device, coupled to the memory, operative to implement the following steps:
obtaining a specification of a plurality of concurrent workflows in a shared computing environment, wherein the specification of a given one of the plurality of concurrent workflows comprises a plurality of states of the given workflow and one or more control variables indicating an allocation of one or more resources for the given workflow in the shared computing environment;
evaluating, using at least one processing device, a plurality of values of the one or more control variables indicating the allocation of the one or more resources, for an execution of said plurality of concurrent workflows, using at least one reinforcement learning agent, wherein said evaluating comprises observing said plurality of states, including a current state comprising a current configuration of said plurality of concurrent workflows and said shared computing environment, and obtaining, from the at least one reinforcement learning agent, an expected utility score for a plurality of combinations of said control variables for the execution of said plurality of concurrent workflows given an allocation of the one or more resources of the shared computing environment corresponding to said combination of said control variables in said current state, wherein the at least one reinforcement learning agent traverses said plurality of states and is trained to select a particular action for a given state, wherein the particular action corresponds to the allocation of the one or more resources of the shared computing environment for the given state; and
initiating an adjustment of the allocation of the one or more resources of the shared computing environment reflecting the combination of the control variables having the expected utility score, from the at least one reinforcement learning agent, that satisfies one or more predefined score criteria.

14. The system of claim 13, further comprising the step of updating said at least one reinforcement learning agent by further training a model with the states that result from said allocation as new training samples.

15. The system of claim 13, wherein said expected utility score further comprises an expected cost depending on one or more of an execution time of the given workflow and a consumption of resources in said shared computing environment.

16. The system of claim 13, wherein said at least one reinforcement learning agent comprises a Deep Q-Learning agent using a Q-Deep Neural Network (QDNN) as a representation of a Q-Function, and wherein said obtaining the expected utility score for the plurality of combinations of said control variables comprises selecting an action at random and computing a cost-to-go from the expected utility score of the selected action updated by an observation of the current state, and wherein an updating of the at least one reinforcement learning agent comprises a training of the QDNN given new samples in iterative epochs.

17. The system of claim 16, wherein the values of the expected utility score are given by predictions from a Deep Neural Network for a predefined number of training epochs.

18. The system of claim 16, wherein the obtaining the expected utility score for the plurality of combinations of said control variables further comprises the step of updating the cost-to-go from a previous state with a future value given by a pretrained neural network.

19. The system of claim 16, wherein said computation of the cost-to-go from the expected utility score of the selected action updated by the observation of the current state additionally comprises the storage of input/output pairs in a database of samples and wherein a training batch for said training of the QDNN is comprised of new samples from the database processed in iterative epochs.

20. A computer program product, comprising a tangible machine-readable storage medium having encoded therein executable code of one or more software programs, wherein the one or more software programs when executed by at least one processing device perform the following steps:
obtaining a specification of a plurality of concurrent workflows in a shared computing environment, wherein the specification of a given one of the plurality of concurrent workflows comprises a plurality of states of the given workflow and one or more control variables indicating an allocation of one or more resources for the given workflow in the shared computing environment;
evaluating, using at least one processing device, a plurality of values of the one or more control variables indicating the allocation of the one or more resources, for an execution of said plurality of concurrent workflows, using at least one reinforcement learning agent, wherein said evaluating comprises observing said plurality of states, including a current state comprising a current configuration of said plurality of concurrent workflows and said shared computing environment, and obtaining, from the at least one reinforcement learning agent, an expected utility score for a plurality of combinations of said control variables for the execution of said plurality of concurrent workflows given an allocation of the one or more resources of the shared computing environment corresponding to said combination of said control variables in said current state, wherein the at least one reinforcement learning agent traverses said plurality of states and is trained to select a particular action for a given state, wherein the particular action corresponds to the allocation of the one or more resources of the shared computing environment for the given state; and
initiating an adjustment of the allocation of the one or more resources of the shared computing environment reflecting the combination of the control variables having the expected utility score, from the at least one reinforcement learning agent, that satisfies one or more predefined score criteria.

* * * * *